US009195361B1

(12) United States Patent
Gil de Paiva et al.

(10) Patent No.: US 9,195,361 B1
(45) Date of Patent: Nov. 24, 2015

(54) SINGLE PROGRESS INDICATOR DEPICTING MULTIPLE SUBPROCESSES OF AN UPLOAD OF A CONTENT ITEM

(75) Inventors: Joao Paulo Gil de Paiva, Zurich (CH); Javier Andés Bargas, Buus (CH); Josh Sassoon, San Francisco, CA (US)

(73) Assignee: Google Inc., Mountain View, CA (US)

( * ) Notice: Subject to any disclaimer, the term of this patent is extended or adjusted under 35 U.S.C. 154(b) by 296 days.

(21) Appl. No.: 13/606,386

(22) Filed: Sep. 7, 2012

(51) Int. Cl.
*G06F 3/048* (2013.01)
*H04L 29/08* (2006.01)
*H04L 29/06* (2006.01)
*G06F 3/0481* (2013.01)

(52) U.S. Cl.
CPC .............. *G06F 3/048* (2013.01); *G06F 3/0481* (2013.01); *H04L 65/601* (2013.01); *H04L 67/06* (2013.01); *H04L 67/2823* (2013.01)

(58) Field of Classification Search
CPC G06F 9/4443; G06F 3/04847; G06F 11/3664
USPC ......................................................... 715/772
See application file for complete search history.

(56) References Cited

U.S. PATENT DOCUMENTS

| 7,805,703 | B2 * | 9/2010 | Shasha et al. ................. 717/105 |
| 8,413,064 | B2 * | 4/2013 | Bauer ..................... G06F 3/048 715/736 |
| 8,615,517 | B1 * | 12/2013 | Vice .................. G06F 17/30017 707/621 |
| 2003/0005022 | A1 * | 1/2003 | Brown .......................... 709/100 |
| 2009/0164933 | A1 * | 6/2009 | Pederson ............. G05B 19/409 715/772 |
| 2011/0154213 | A1 * | 6/2011 | Wheatley et al. ............. 715/738 |
| 2011/0307905 | A1 * | 12/2011 | Essey .................. G06F 11/3476 719/318 |
| 2012/0233648 | A1 * | 9/2012 | Raman et al. .................... 725/93 |
| 2012/0293327 | A1 * | 11/2012 | Mountain ..................... 340/540 |

* cited by examiner

*Primary Examiner* — Nicholas Ulrich
*Assistant Examiner* — Joy M Weber
(74) *Attorney, Agent, or Firm* — Lowenstein Sandler LLP (57) ABSTRACT

A single progress indicator for depicting multiple subprocesses for an upload of a content item is presented. A method to create the single progress indicator is also provided. The method can include determining a progress of an upload data transfer subprocess of an upload communication session associated with a data item. The method can also include providing the progress of the upload data transfer subprocess for depiction in a single progress indicator. The method can include determining progresses of one or more secondary operation subprocesses of the upload communication session associated with the data item. Lastly, the method can include providing the progresses of the one or more secondary operation subprocesses for depiction in the single progress indicator in conjunction with the progress of the upload data transfer subprocess, wherein the progresses of the subprocesses are represented in the single progress indicator distinctly from each other.

20 Claims, 6 Drawing Sheets

```
Receive request to upload a content item to a shared content hosting and
delivery platform from a user
                                                                    410
```

```
Establish upload communication session
                                                                    420
```

```
Determine progress of upload data transfer subprocess of the upload
communication session
                                                                    430
```

```
Determine progress of one or more secondary processing subprocesses of the
upload communication session
                                                                    440
```

```
Providing a UI with a single progress indicator depicting each of the determined
progress of the upload data transfer subprocess and the determined progress
of the secondary processing subprocess, wherein each subprocess progress is
depicted in a distinct manner from the other subprocesses in the single
progress indicator
                                                                    450
```

```
Updating the single progress indicator with a most current progress of the
upload data transfer subprocess and the secondary processing subprocess
until the upload communication session is complete
                                                                    460
```

Establish upload communication session with a shared content hosting and delivery platform
510

Receive a file representing a UI for a single progress indicator associated with the upload communication session
520

Render file in web browser application in order to generate UI with a single progress indicator depicting a progress of an upload data transfer subprocess and a progresses of one or more secondary processing subprocesses of the upload communication session
530

Receive data to update the UI with most recent progress of the upload data transfer subprocess and the progress of the one or more secondary processing suubprocesses until the upload communication session is complete
540

SINGLE PROGRESS INDICATOR DEPICTING MULTIPLE SUBPROCESSES OF AN UPLOAD OF A CONTENT ITEM

TECHNICAL FIELD

Embodiments of the present disclosure relate to the field of content sharing platforms and, more particularly, to a single progress indicator depicting multiple subprocesses of an upload of a content item to a content sharing platform.

BACKGROUND

On the Internet, content sharing platforms allow users to upload, view, and share content, such as video content, image content, audio content, and so on. This shared content may include content from professional content creators, e.g., movie clips, TV clips, and music videos, as well as content from amateur content creators, e.g., video blogging and short original videos.

One aspect of content sharing platforms is an upload of content items to the content sharing platform by users of the platform. Upload may refer to the sending of data from the user's computer system or mobile device to a remote system of the content sharing platform with the intent that the content sharing platform should store a copy of the data being transferred. However, the entire upload process for a content item may involve other processes beyond just the upload data transfer of the content item. For example, the content item may also be transcoded as part of the upload process. Transcoding is the direct digital-to-digital data conversion of one encoding to another. Transcoding is often performed to provide support for different file formats for the content (e.g., mobile, different file sizes, different resolutions, different codecs, etc.).

The content sharing platform aims to communicate to the user the progress of the upload process to avoid user confusion regarding upload progress status. When a user uploads content to a content sharing platform, he or she is typically given feedback regarding the progress of the upload process. For example, the user may be shown a percentage completed of the upload data transfer of the content item to the content sharing platform. However, there may be various problems associated with providing feedback regarding the upload process to users. These problems may arise from the amount of information provided to the users. For instance, the feedback may occupy a large amount of user interface (UI) space on a web page presented by the content sharing platform because of the amount of information that is being imparted to the users. Another example is that the feedback may become confusing to users because the amount of information displayed becomes overwhelming and not easily understood by the user in a short period of time.

SUMMARY

In one implementation, a method to provide a single progress indicator that depicts multiple subprocesses of an upload of a content item is presented. The method includes determining a progress of an upload data transfer subprocess of an upload communication session associated with a data item. The method can also include providing the progress of the upload data transfer subprocess for depiction in a single progress indicator. The method can include determining progresses of one or more secondary operation subprocesses of the upload communication session associated with the data item. Lastly, the method can include providing the progresses of the one or more secondary operation subprocesses for depiction in the single progress indicator in conjunction with the progress of the upload data transfer subprocess, wherein each of the progress of the subprocesses are represented in the single progress indicator distinctly from each other.

In one implementation, one of the secondary operation subprocesses is a transcoding process. Furthermore, the method can include each of the progress of the subprocesses represented in the single progress indicator with distinct color shades. In addition, the method can include each of the progresses of the subprocesses represented in the single progress indicator with distinct patterns.

Furthermore, the method can include the single progress indicator comprises a horizontal bar. In some implementations, the single progress indicator of the method comprises a pie chart. In other implementations, the single progress indicator of the method comprises a vertical bar. In yet other implementations, the single progress indicator of the method comprises a circle diagram having concentric circles each representing the progresses of the subprocesses.

In additional implementations, computing devices for performing the operations of the above described embodiments are also implemented. Additionally, in implementations of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various embodiments of the disclosure.

DETAILED DESCRIPTION

A system and method for a single progress indicator depicting multiple subprocesses of an upload of a content item are described. In some implementations, a single progress indicator simultaneously depicts at least two ongoing subprocesses associated with an upload of a content item (e.g., upload data transfer subprocess of the content item and a secondary operation subprocess of the uploaded content item). In some implementations, such as with content items that are videos, the secondary operation subprocess includes transcoding of the uploaded content item, which, in many cases, can begin prior to completion of the upload data transfer subprocess of the content item, and therefore occur in parallel.

In some implementations, the single progress indicator includes overlapping sections that each indicate a percentage completion of the associated subprocess of the overall upload process. The overlapping sections can each have a distinct shading, coloring, label, or pattern that distinguishes the section from the other sections. The single progress indicator is also capable of displaying a progress in percentage numbers of the highest-completed subprocess depicted in the single progress indicator. Examples of a single progress indicator may include, but are not limited to, a horizontal bar, a vertical bar, a pie chart, or a circle diagram with concentric circles.

A method to provide a single progress indicator that depicts multiple subprocesses for upload of a content item includes determining a progress of an upload data transfer subprocess of an upload communication session associated with a data item, and providing the progress of the upload data transfer subprocess for depiction in a single progress indicator. The method can also include determining progresses of one or more secondary operation subprocesses of the upload communication session associated with the data item, and providing the progresses of the secondary operation subprocesses for depiction in the single progress indicator in conjunction with the progress of the upload data transfer subprocess. The progress of each subprocess can be represented in the single progress indicator distinctly from other processes.

It is to be appreciated that in accordance with one or more aspects described in this disclosure, users can opt-out of providing personal information, demographic information, location information, proprietary information, sensitive information, or the like in connection with data gathering aspects. Moreover, one or more aspects described herein can provide for anonymizing collected, received, or transmitted data.

Figure 1:
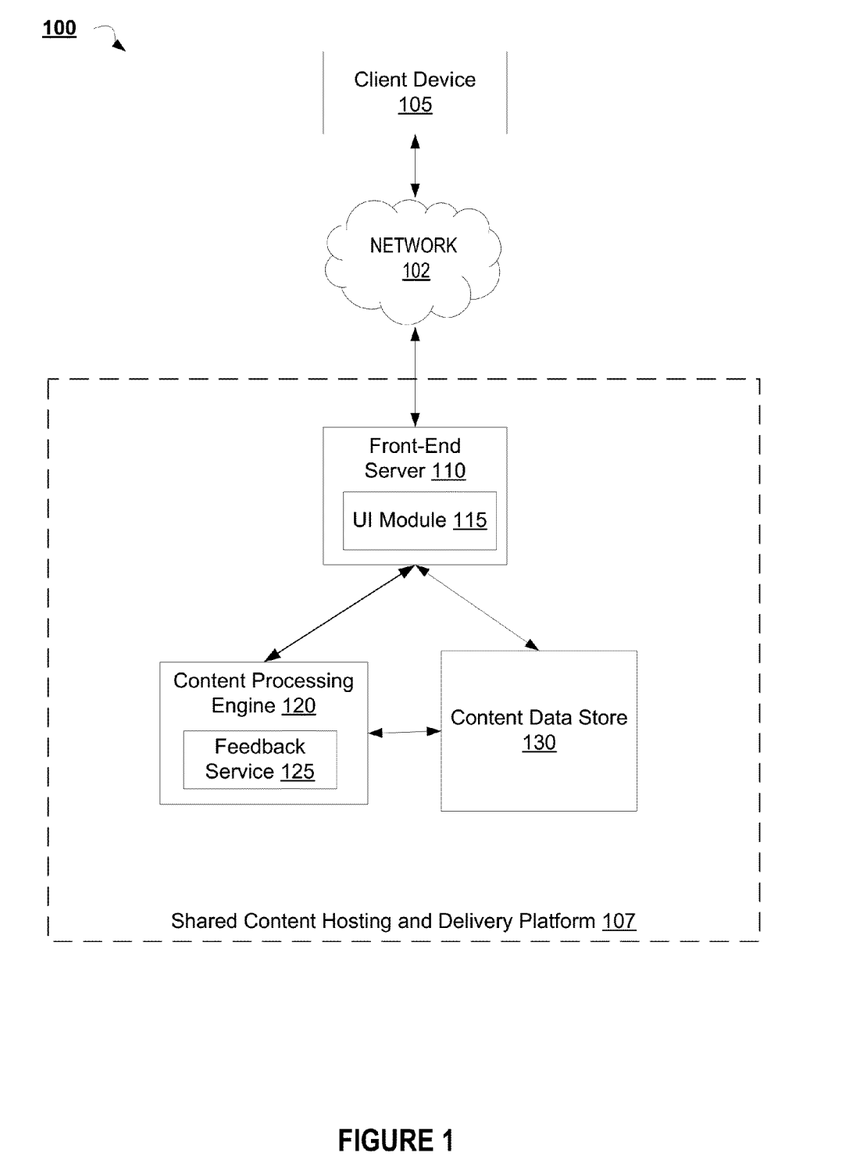
FIG. 1 illustrates an exemplary system architecture, in accordance with one embodiment of the present disclosure.

FIG. 1 illustrates an exemplary system architecture 100, in accordance with one embodiment of the present disclosure. System 100 includes a client device 105 communicably coupled to a shared content hosting and delivery platform 107 via a network 102. The network 102 includes the Internet in one embodiment. In other embodiments, other networks, wired and wireless, such as an intranet, local area network (LAN), wide area network (WAN), or broadcast network may be used as or be part of network 102.

As illustrated, shared content hosting and delivery platform 107 includes front-end server 110, a content processing engine 120, and a content data store 130. A data store may include, but is not limited to, a table, a database, a directory, a repository, and one or more files, to name a few examples. One or more client devices 105 are in communication with the front-end server 110 over the network 102.

The client device 105 may be any type of computing device, for example, a device including a processor, a computer-readable medium, and a memory. The client device 105 may be, for example, a personal computer, a laptop computer, a tablet computer, a personal digital assistant (PDA), a cellular telephone, other mobile devices, etc. In some implementations, the client device 105 may be executing a browser application or other application adapted to communicate over Internet related protocols (e.g., TCP/IP and HTTP) and/or display a user interface. While only a single client device 105 is shown in FIG. 1, system 100 may support a large number of concurrent sessions with many client devices 105.

Shared content hosting and delivery platform 107 is capable of operating within a single server device or on multiple server devices. For example, although each of front-end server 110, content processing engine 120, and content data store 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

During operation of system 100, a user accesses shared content hosting and delivery platform 107 via client device 105 over network 102. The front-end server 110 receives communications from the client device 105, and processes and/or directs these communications accordingly. In one embodiment, the front-end server 110 comprises a processing device and a computer-readable memory.

Front-end server 110 is communicably coupled to a content processing engine 120, which may reside on the same machine as front-end server 110 or a different machine. Content processing engine 120 may be implemented in hardware, software, firmware, or any combination of the above. In implementations of the disclosure, content processing engine 120 accesses user content that is being uploaded to system 100 for storage in content data store 130 to process this uploaded content for sharing on the shared content hosting and delivery platform 107. Upload may refer to the sending of data from the user's client device 105 to the shared content hosting and delivery platform 107 with the intent that the shared content hosting and delivery platform 107 should store a copy of the data being transferred (e.g., in content data store 130).

In implementations of the disclosure, user content includes content generated by a user or content generated by a third party and permissibly uploaded by the user. In some implementations, the content includes movie clips, TV clips (news, sports, shows, etc.), music videos, video blogs, video shorts, audio files, still pictures, text, and so on. In one embodiment, the content processing engine 120 notifies users of the types of information that may be stored in the content data store 130, and provides the user the opportunity to opt-out of having such information stored and/or accessible by and/or shared with the content processing engine 120.

In some implementations, upon receiving at least a portion of an uploaded content item, the content processing engine 120 performs secondary processing on the uploaded content as part of the overall upload process. In one implementation, the processing of the content processing engine 120 is termed "secondary" or "secondary operation subprocess" because it occurs subsequent to (or in parallel) with the upload data transfer of the content being processed. In one example implementation, when a video is uploaded to shared content hosting and delivery platform 107, content processing engine 120 performs transcoding of the video as the secondary processing.

Transcoding is the direct digital-to-digital data conversion of one encoding to another. Transcoding is often performed to provide support for different file formats for the content (e.g., mobile, different file sizes, different resolutions, different codecs, etc.). In some embodiments, transcoding refers to a two-step process in which the original file/data is decoded to an intermediate uncompressed format, which is then encoded into the target format. In other implementations, transcoding refers to the process of directly changing assembled software code to work on a different platform or operating system. In another exemplary implementation, the secondary processing performed by the content processing engine 120 includes translation of text to another language or any other type of content conversion processing.

In one implementation, the content processing engine 120 includes a feedback service 125. Feedback service 125 can determine a progress of the secondary processing performed by the content processing engine 120 and provides this progress information to a user interface (UI) module 115 of the front-end server 110. In one embodiment, feedback service 125 determines a percentage of the total file size of the content item that has been secondarily processed and provides this percentage information to the UI module 115. The feedback service 125 can provide a continuous communication (e.g., streaming) of progress information of the secondary processing to the UI module 115 while the secondary processing is occurring. In other implementations, the communication of progress information is periodically sent by feedback service 125 in discrete intervals.

The UI module 115 of front-end server 110 can be implemented in hardware, software, firmware, or any combination of the above. In one implementation, the UI module 115 creates a representation of a UI with a single progress indicator that depicts the status of multiple subprocesses of an upload of a content item. The UI may be a file that is rendered in a web browser application of client device 105. The file may be described in a markup language that depicts the single progress indicator in a graphical user interface (GUI). In some implementations, UI module 115 may be located in a different server device of shared content hosting and delivery platform 107 than the front-end server 110, such as in content processing engine 120.

In one implementation, the single progress indicator depicts both of a progress of an upload data transfer subprocess and a progress of a secondary operation subprocess performed by the content processing engine 120 as part of an overall upload process for a content item. The upload data transfer progress information can be determined by UI module 115 based on a total file size of the content item and a current transferred file size of the content item. In one implementation, client device 105 provides the total file size of the upload content item upon initial communication with the front-end server 110 when establishing an upload communication session with front-end server 110. In another implementation, the client device 105 provides the upload data transfer progress data locally as part of rendering the single progress indicator. For example, the file representing the UI having the single progress indicator may include code that requests this information locally from the client device 105 upon rendering of the UI at the client device 105.

Figure 2:
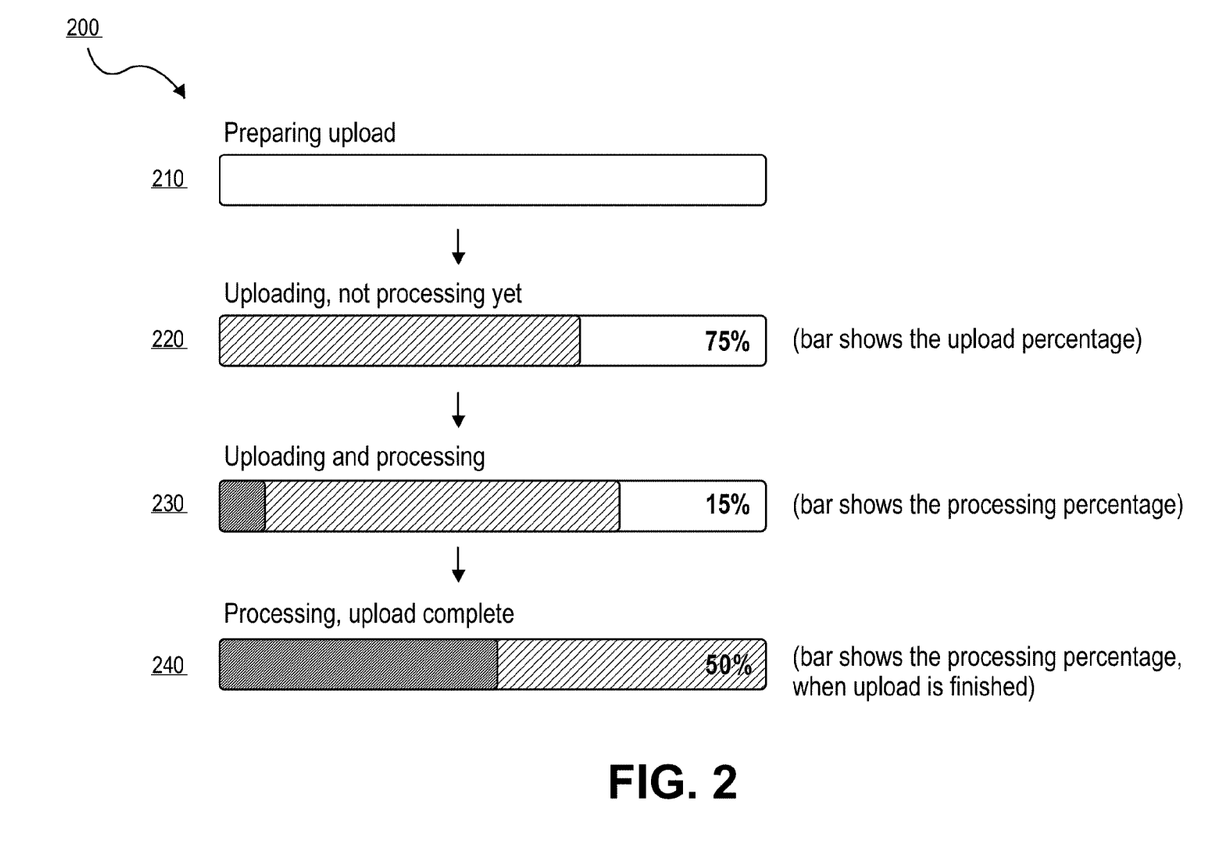
FIG. 2 is a screenshot of a single progress indicator in the form of a horizontal bar that depicts multiple subprocesses of upload of a content item according to an embodiment of the disclosure.

In some implementations, the single progress indicator utilizes distinct coloring, shading, or patterns to differentiate the multiple different upload subprocesses represented in the single progress indicator. FIG. 2 is a screenshot of a sample single progress indicator 200 in the form of a horizontal bar that depicts multiple subprocesses of an upload of a content item according to an embodiment of the disclosure. The single progress indicator 200 depicts a two-subprocess upload process including an upload data transfer subprocess of the content item and then a transcoding subprocess of the content item. As data of a content item cannot be transcoded until at least part of the data is uploaded to the shared content hosting and delivery platform 107, the transcoding subprocess occurs in parallel with or subsequent to the upload data transfer subprocess.

As shown in FIG. 2, state 210 of single progress indicator 100 depicts the beginning of an upload data transfer subprocess of a content item. State 210 shows that the upload data transfer has not yet started, but is to begin shortly. In one implementation, state 210 is shown while the client device 105 and the shared content hosting and delivery platform 107 are negotiating communication and upload protocols for the content item upload process. State 220 of single progress indicator 200 depicts that the upload data transfer subprocess for the content item is occurring, but the secondary operation subprocess (e.g., transcoding subprocess) is not occurring yet. In some implementations, the single progress indicator 200 provides the percentage completion number of one of the subprocesses associated with the single progress indicator. For example, state 220 shows that the upload data transfer subprocess is 75% complete.

State 230 of single progress indicator 200 depicts the simultaneous progresses of the upload data transfer subprocess and the secondary operation subprocess of the content item. The upload data transfer subprocess is shown in the lighter shading and is further along than the progress of the secondary operation subprocess shown in the darker shade. The single progress indicator 200 of state 230 also depicts that the progress of the secondary operation subprocess is 15% complete, as compared to the further along progress of the upload data transfer subprocess. In other implementations, the stated completion percentage may depict whichever process has the highest completion percentage (e.g., in the case of state 230, it would state 85% for upload progress).

At state 240 of single progress indicator 200, the upload data transfer subprocess is completed, but the secondary operation subprocess is still occurring. This is shown by the lighter shade of the upload data transfer subprocess completely filling the progress indicator 200, while the darker shade of the secondary operation subprocess half fills the progress indicator 200. In addition, the progress indicator states that the secondary operation subprocess is 50% complete.

Embodiments of the single progress indicator, such as single progress indicator 200 depicted in FIG. 2, give a user a more accurate and complete picture of the overall upload processing of a content item. In previous upload progress UIs, a content item may be completely uploaded, but the UI still shows that the user must wait, without any indication what the waiting is for. Embodiments of the single progress indicator depicting multiple subprocesses of an upload process prevent such user confusion regarding the progress and status of the upload of a content item.

Figure 3A:
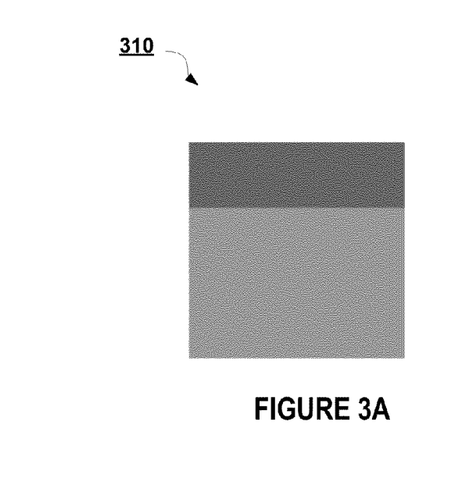
FIGS. 3A-3C illustrate alternative single progress indicators for depicting multiple subprocesses of an upload of a content item according to embodiments of the disclosure.
Figure 3B:
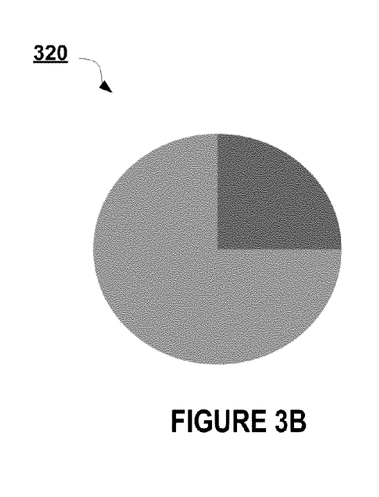
Figure 3C:
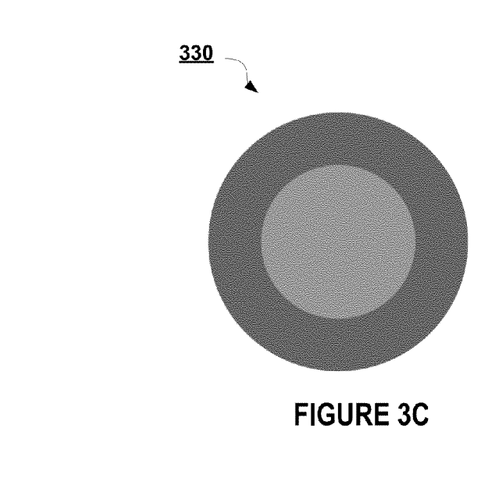

FIGS. 3A-3C illustrate alternative single progress indicators 310, 320, 330 for depicting multiple upload processes according to embodiments of the disclosure. In each single progress indicator 310-330, the darker shade depicts the upload process, which is shown as 100% complete, and the lighter shade depicts the secondary processing which is ongoing. FIG. 3A depicts a single progress indicator 310 in the form a vertical bar. FIG. 3B depicts a single progress indicator 320 in the form of a pie chart. FIG. 3C depicts a single progress indicator 330 in the form of concentric circles that grow outwards as their associated subprocessing steps complete.

Figure 4:
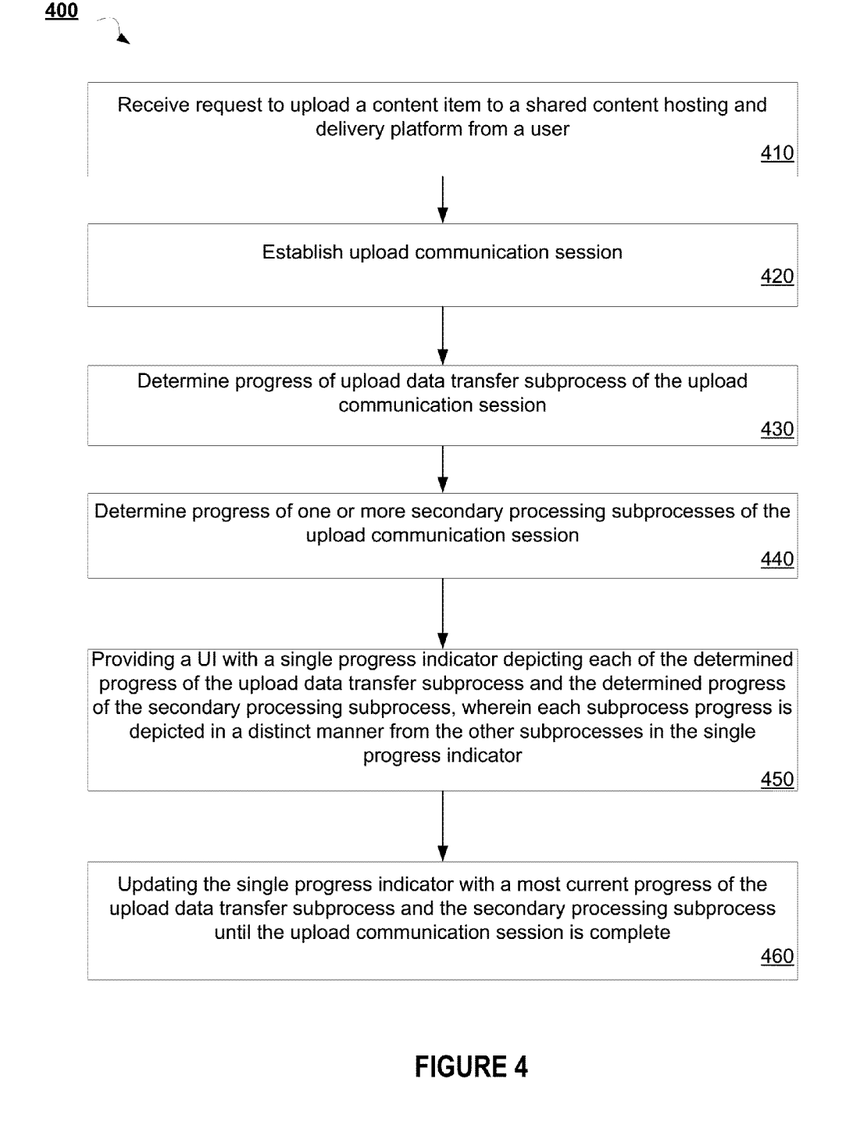
FIG. 4 is a flow diagram illustrating a method of creating a single progress indicator depicting multiple subprocesses of an upload of a content item according to an embodiment of the disclosure.
Figure 5:
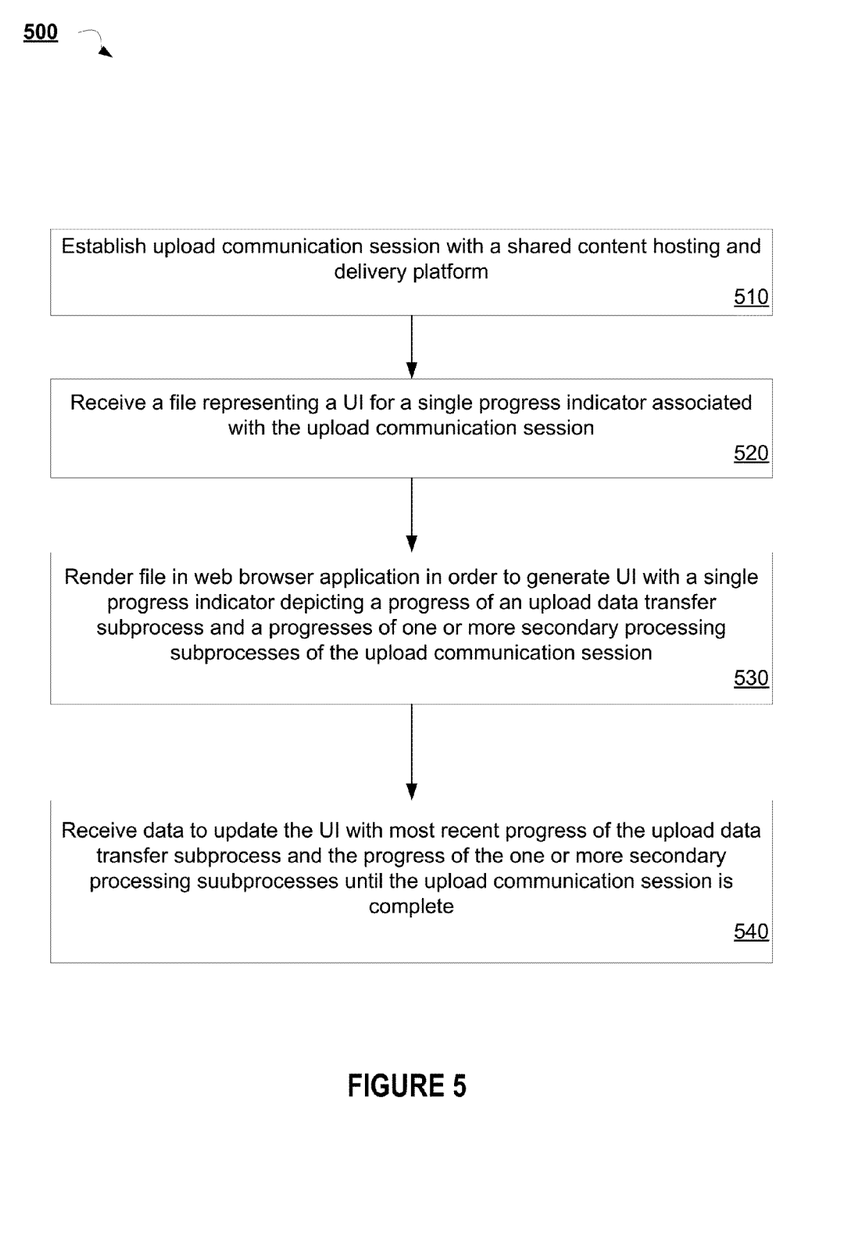
FIG. 5 is a flow diagram illustrating a method of providing at a client device a single progress indicator depicting multiple subprocesses of upload of a content item according to an embodiment of the disclosure.

FIGS. 4 and 5 are flow diagrams of various implementations of methods for generating and providing a single progress indicator depicting multiple subprocesses of an upload process for a content item. The methods are performed by processing logic that may include hardware (circuitry, dedicated logic, etc.), software (such as is run on a general purpose computer system or a dedicated machine), or a combination of both. In one embodiment, the methods of FIGS. 4-5 may be performed by a content processing engine 120 and/or a UI module 115 running on a server machine or another machine as described with respect to FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 4 is a flow diagram illustrating a method 400 of creating a single progress indicator depicting multiple subprocesses of an upload process for a content item according to an embodiment of the disclosure. At block 410, a request is received from a user to upload a content item to a shared content hosting and delivery platform. Then, at block 420, an upload communication session is established with the user.

At block 430, a progress of an upload data transfer subprocess of the upload communication session is determined. In one implementation, the progress of the upload data transfer subprocess is determined by the shared content hosting and delivery platform based on a total file size of the content item (e.g., indicated by the user device as part of establishing the communication session) and a current size of the content item data transferred to shared content hosting and delivery platform. In another embodiment, the user device determines the current upload progress and contributes this information.

At block 440, a progress of one or more secondary operation subprocesses of the upload communication session is determined. In one implementation, the progress of the one or more secondary operation subprocesses is determined by the shared content hosting and delivery platform by dividing a current amount of file size processed for the secondary operation subprocess by a total size of the file. The progress of the secondary operation subprocess can be provided by a feedback service of a content processing server of the shared content hosting and delivery platform. In one implementation, the secondary operation subprocess is a transcoding process. In other implementations, the secondary operation subprocess includes other types of content conversion processes, such as translation of text to a different language, and so on. In some implementations, there are more than one secondary operation subprocesses that occur (e.g., transcoding and translation).

At block 450, a UI with a single progress indicator is provided to the client device of the user. In one embodiment, code to generate the UI is stored in a file that is sent to the client device of the user. This file may then be rendered by a web browser application of the client device. In one implementation, the single progress indicator simultaneously depicts the progress of the upload data transfer subprocess and the progress of the secondary operation subprocess. Each subprocess is distinctly represented (e.g., different shading, coloring, and/or pattern) in the single progress indicator. The single progress indicator may include, but is not limited to, a horizontal bar, a vertical bar, a pie chart, or a circle diagram with concentric circles.

Subsequently, at block 460, the single progress indicator is continuously updated with data representing a most current progress of the upload data transfer subprocess and a most current progress of the one or more secondary operation subprocesses until the upload communication session is complete. In some implementations, the update data may be provided at periodic intervals to the single progress indicator. In other implementations, the update data is streamed to the client device in a continuous manner.

FIG. 5 is a flow diagram illustrating a method 500 of providing a single progress indicator depicting multiple subprocesses of an upload process of a content item at a client device according to an embodiment of the disclosure. At block 510 of method 500, an upload communication session is established at the client device with a shared content hosting and delivery platform. In one implementation, the upload communication session is established in response to a request from a user of the client device to upload a content item to the shared content hosting and delivery platform.

At block 520, a file is received that represents a UI for a single progress indicator associated with the upload communication session. At block 530, the file is rendered by a web browser application of the client device. As part of rendering the file, the UI depicting the single progress indicator is generated and displayed on the client device. The single progress indicator simultaneously depicts a progress of an upload data transfer subprocess and progresses of one or more secondary operation subprocess of the upload communication session. In one implementation, the secondary processing is a transcoding process. In other implementations, the secondary processing includes other types of content conversion processes, such as translation of text to a different language, and so on. In some implementations, there may be more than one secondary processing step that occurs (e.g., transcoding and translation).

Lastly, at block 540, data is received to update the UI with a most recent progress of the upload data transfer subprocess and a most recent progress of the secondary operation subprocesses of the upload communication session. In one implementation, this update data is received periodically until the upload data transfer and the secondary operation subprocesses are complete. In one implementation, the progress of the upload data transfer subprocess is provided by the shared content hosting and delivery platform based on a total file size of the content item (indicated by the user device as part of establishing the communication session) and a current amount of content item data received at the shared content hosting and delivery platform. In another implementation, the user device locally determines the current upload data transfer subprocess progress and contributes this information. In one implementation, the progress of the secondary operation subprocess is provided by a feedback service of a content processing server of the shared content hosting and delivery platform.

Figure 6:
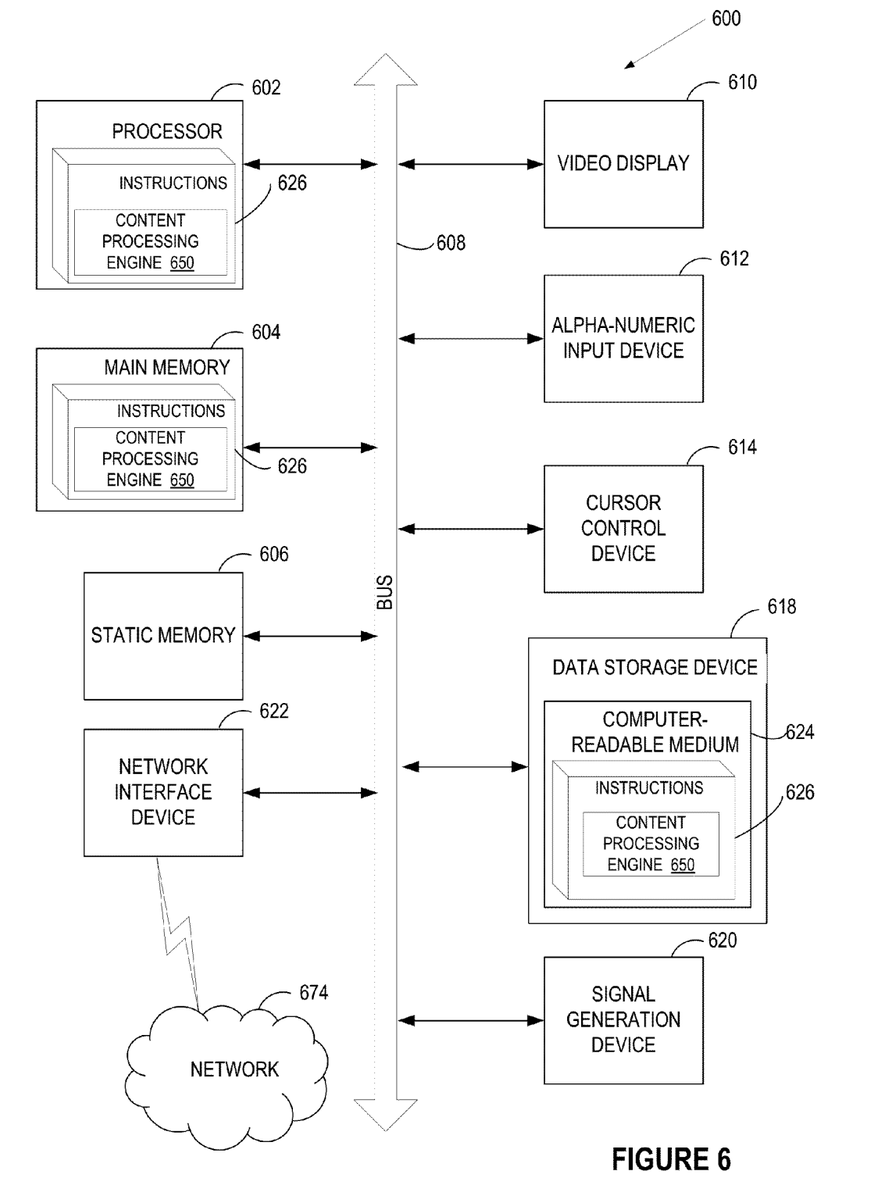
FIG. 6 is a block diagram of an exemplary computer system that may perform one or more of the operations described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one embodiment, the instructions 626 include instructions for a content processing engine 650, which may correspond to content processing engine 120 of FIG. 1, and/or a software library containing methods that call a content processing engine. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A method comprising:
determining, by a computing device, a progress of an upload data transfer subprocess of an upload communication session associated with a data item;
providing the progress of the upload data transfer subprocess for depiction in a single progress indicator;
determining progresses of one or more secondary operation subprocesses of the upload communication session associated with the data item, wherein the one or more secondary operation subprocesses comprise a transcoding process and are performed concurrently with the upload data transfer subprocess;
providing, for concurrent depiction in the single progress indicator, the progresses of the one or more secondary operation subprocesses and the progress of the upload data transfer subprocess, wherein the progress of the upload data transfer process and the progresses of the one or more secondary operation subprocesses are represented in the single progress indicator distinctly from each other and overlaying each other;
wherein the single progress indicator comprises labels to identify each distinct representation of the upload data transfer process and the one or more secondary operation subprocesses.

2. The method of claim 1, wherein one of the one or more secondary operation subprocesses comprises a translation process.

3. The method of claim 1, wherein the progress of the upload data transfer subprocess and the progress of the one or more secondary operation subprocesses are each represented in the single progress indicator with distinct colors.

4. The method of claim 1, wherein the progress of the upload data transfer subprocess and the progress of the one or more secondary operation subprocesses are each represented in the single progress indicator with distinct patterns.

5. The method of claim 1, wherein the single progress indicator comprises a horizontal bar.

6. The method of claim 1, wherein the single progress indicator comprises a pie chart.

7. The method of claim 1, wherein the single progress indicator comprises a vertical bar.

8. The method of claim 1, wherein the single progress indicator comprises a circle diagram having concentric circles each representing the progress of the upload data transfer subprocess and the progresses of the one or more secondary operation subprocesses.

9. A computing device comprising:
a display;
a memory; and
a processing device communicably coupled to the display and the memory, wherein the processing device is configured to:
receive a file representing a user interface (UI) for a single progress indicator associated with an upload communication session for upload of a data item to a server device;
render the file in a web browser application executable from the memory by the processing device, wherein rendering the file generates the UI with the single progress indicator on the display;
depicting concurrently in the single progress indicator each of a progress of an upload data transfer subprocess and progresses of one or more secondary operation subprocesses of the upload communication session, wherein the progress of each of the subprocesses is represented in the single progress indicator in a manner that distinguishes each subprocess from the other subprocesses while overlaying each other, and wherein the one or more secondary operation subprocesses comprise a transcoding process and are performed concurrently with the upload data transfer subprocess, wherein the single progress indicator comprises labels to identify each distinct representation of the upload data transfer process and the one or more secondary operation subprocesses; and
receiving data to update the single progress indicator with a most recent progress of each of the subprocesses of the upload communication session.

10. The computing device of claim 9, wherein the server is hosted by a shared content hosting and delivery platform.

11. The computing device of claim 9, wherein the data to update the single progress indicator is received until the upload communication session is complete.

12. The computing device of claim 9, wherein the processing device is further configured to determine, locally on the computing device, the data to update the single progress indicator with the most recent progress of the upload data transfer subprocess.

13. The computing device of claim 9, wherein the data to update the single progress indicator is received from the server device.

14. The computing device of claim 9, wherein the computing device is a tablet computer.

15. The computing device of claim 9, wherein the computing device is a mobile phone.

16. A non-transitory computer readable storage medium having instructions that, when executed by a processing device, cause the processing device to perform operations comprising:
creating, by a computing device, a file in a markup language representing a user interface (UI) comprising a single progress indicator;
determining a progress of an upload data transfer subprocess and a progress of a secondary operation subprocess of an upload session for a data item, wherein the secondary operation subprocess comprises a transcoding process and is performed concurrently with the upload data transfer subprocess;
providing the file to a client device in order for the client device to render the file and display the UI having the single progress indicator on the client device, wherein the progress of the upload data transfer process and the progresses of the secondary operation subprocesses are concurrently depicted in the single progress indicator and are represented in the single progress indicator distinctly from each other and overlaying each other, wherein the single progress indicator comprises labels to identify each distinct representation of the upload data transfer process and the one or more secondary operation subprocesses; and providing an updated progress for the upload data transfer subprocess and an updated progress for the secondary operation subprocess to the client device in order to update the single progress indicator until the upload session is complete.

17. The non-transitory computer-readable storage medium of claim 16, wherein the secondary operation subprocess comprises a translation process.

18. The non-transitory computer-readable storage medium of claim 16, wherein the progress of the upload data transfer subprocess and the progress of the secondary operation subprocess are each represented in the single progress indicator with distinct colors.

19. The non-transitory computer-readable storage medium of claim 16, wherein the progress of the upload data transfer subprocess and the progress of the secondary operation subprocess are each represented in the single progress indicator with distinct patterns.

20. The non-transitory computer-readable storage medium of claim 16, wherein the single progress indicator comprises a horizontal bar.

* * * * *